United States Patent [19]

Lahman

[11] 4,290,733
[45] Sep. 22, 1981

[54] FORAGE STACK MOVER

[75] Inventor: Fritz Lahman, Hecla, S. Dak.

[73] Assignee: Lahman Manufacturing Company, Inc., Hecla, S. Dak.

[21] Appl. No.: 115,945

[22] Filed: Jan. 28, 1980

[51] Int. Cl.³ .............................. B60P 1/18; B60P 1/36
[52] U.S. Cl. ................................. 414/476; 414/484; 414/491; 280/83
[58] Field of Search ............... 414/434, 437, 474–476, 414/484, 491, 528; 280/43, 43.23, 81 R, 83, 656

[56] References Cited

U.S. PATENT DOCUMENTS

| 756,255 | 4/1904 | Love. | |
|---|---|---|---|
| 2,748,965 | 6/1956 | Grey | 214/505 |
| 2,753,064 | 7/1956 | Lesser | 214/506 |
| 3,012,682 | 12/1961 | Williamson | 214/82 |
| 3,013,677 | 12/1961 | Thompson | 214/85.1 |
| 3,209,932 | 10/1965 | Schiltz | 414/491 |
| 3,298,550 | 1/1967 | Schiltz | 214/505 |
| 3,335,887 | 8/1967 | Snook | 414/476 |
| 3,544,127 | 12/1970 | Dobson | 280/43.23 X |
| 3,663,040 | 5/1972 | Weaver et al. | 280/43.23 |
| 3,688,926 | 9/1972 | Stefanelli | 280/43.23 X |
| 3,963,259 | 6/1976 | Massey | 280/80 |
| 4,006,913 | 2/1977 | Rimhagen | 280/81 R |
| 4,050,707 | 9/1977 | Glumac | 280/43.23 |
| 4,051,968 | 10/1977 | Massey | 214/80 |

FOREIGN PATENT DOCUMENTS 1361395  7/1974  United Kingdom ............... 414/476

Primary Examiner—Robert W. Saifer
Attorney, Agent, or Firm—Schroeder, Siegfried, Ryan, Vidas, Steffey & Arrett

[57] ABSTRACT

A forage stack moving device has a tongue and bed mechanism rigidly secured to each other in which a plurality of endless chain elements pass over a plurality of longitudinal beam members and are driven by a mechanism driving all chains in unison while loading and unloading a stack. The bed mechanism is supported by a pair of fourbar linkages, each having a pair of substantially vertically extending arms pivotally joined to a longitudinally extending carriage member to which are secured a pair of wheels, each longitudinally extending member having a hydraulically controlled extensible member connected to the bed mechanism to move the carriage member and the wheels secured thereto, causing the bed mechanism to tilt for loading and unloading and to be substantially level during transportation of any forage stack on the bed mechanism.

8 Claims, 12 Drawing Figures

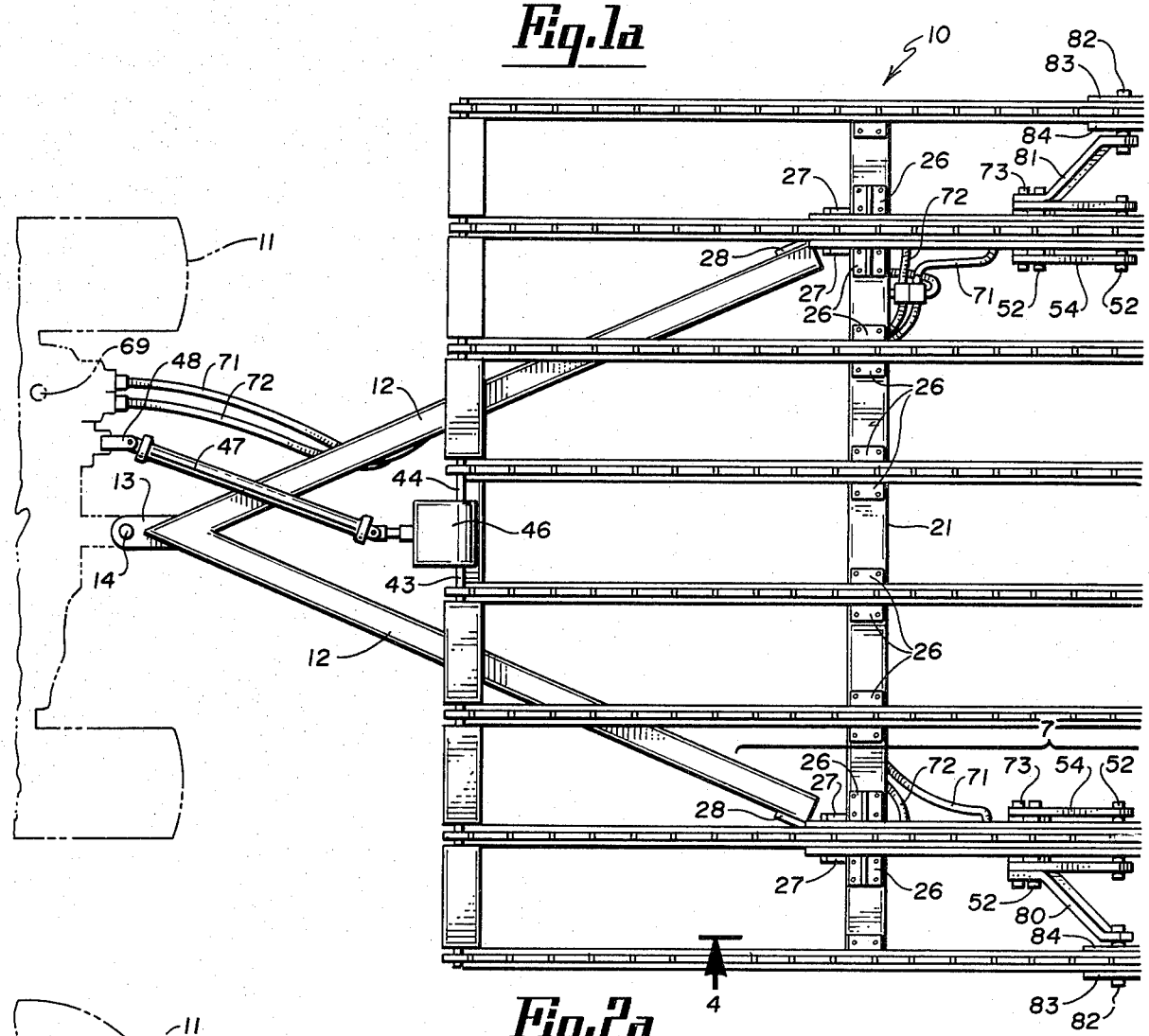

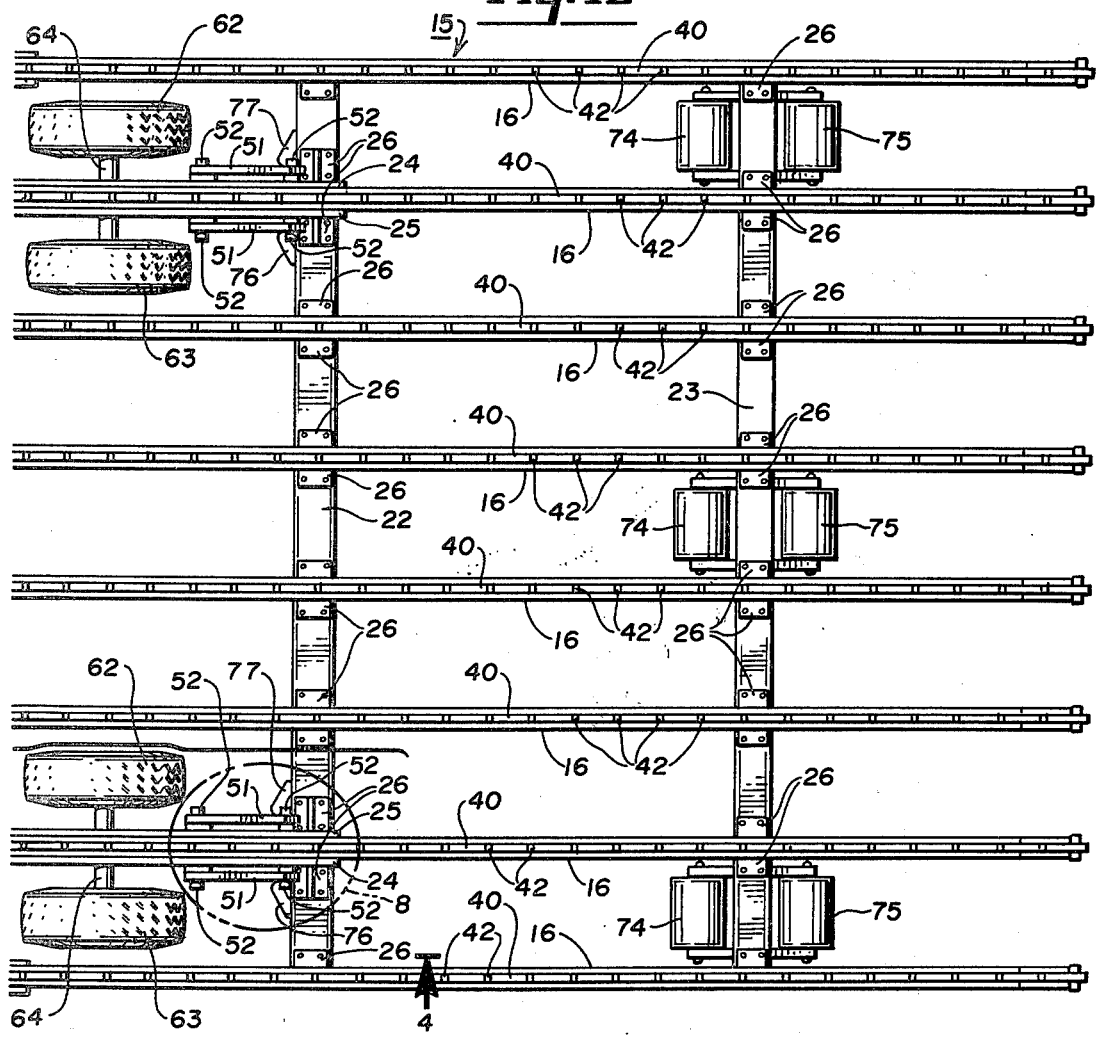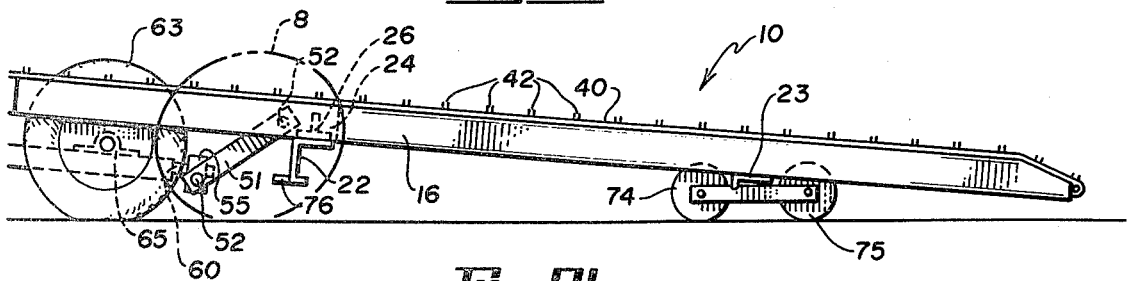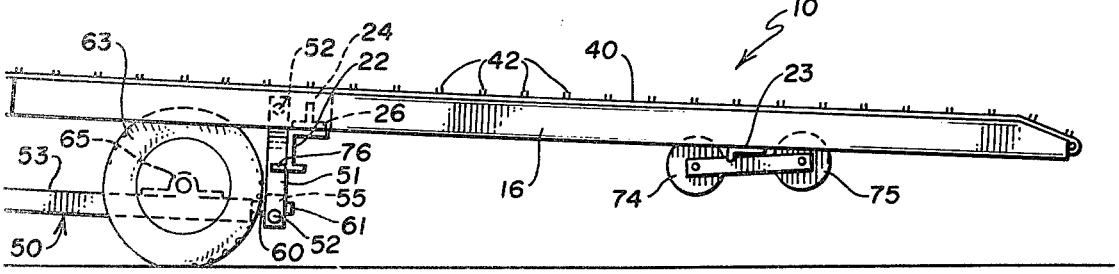

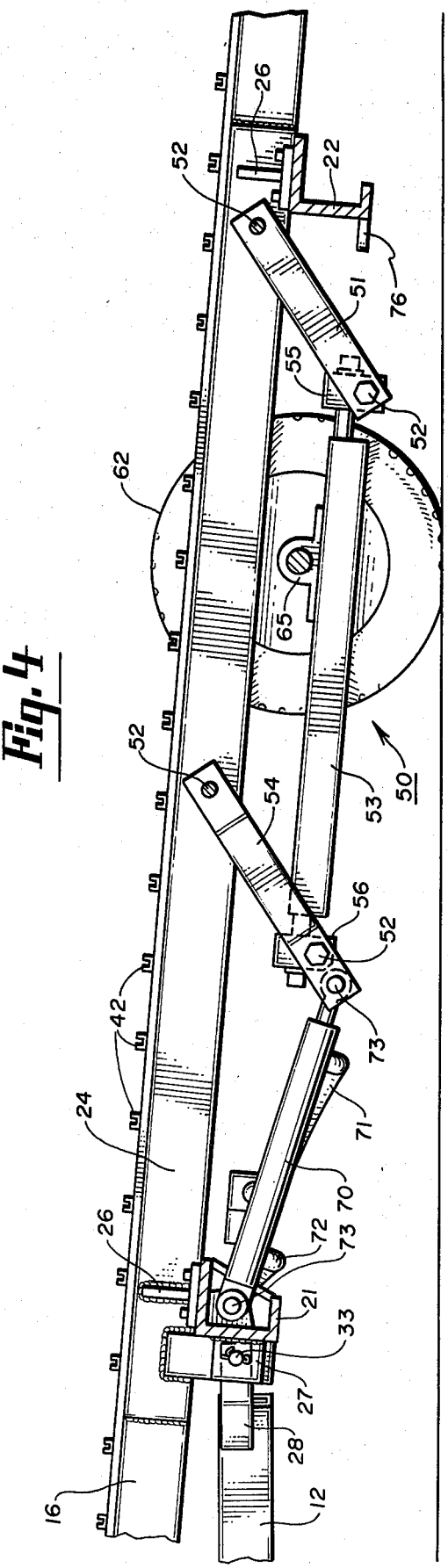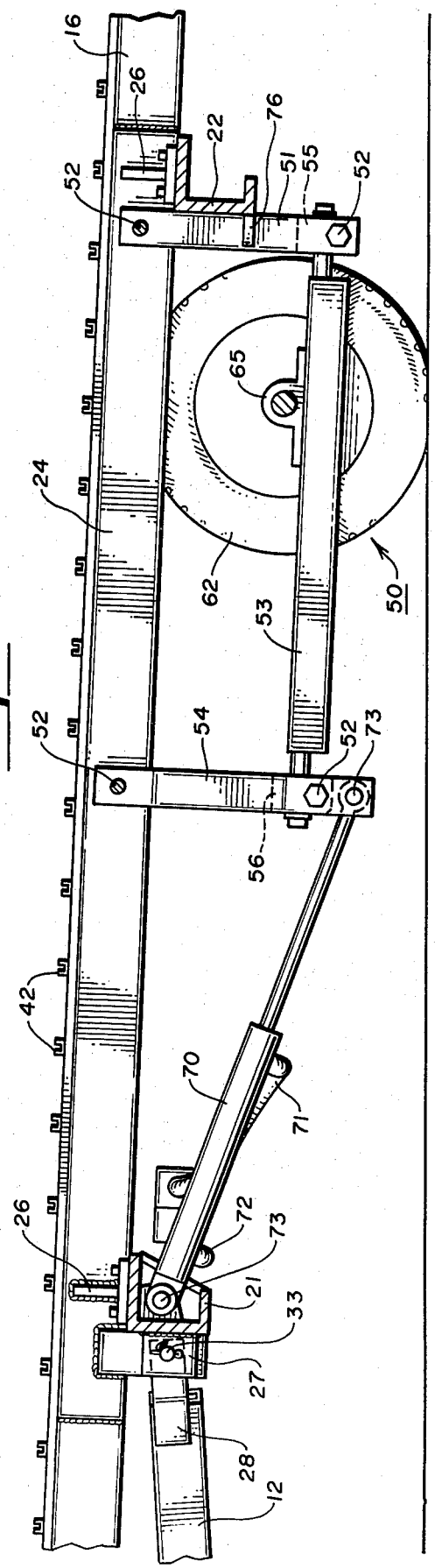

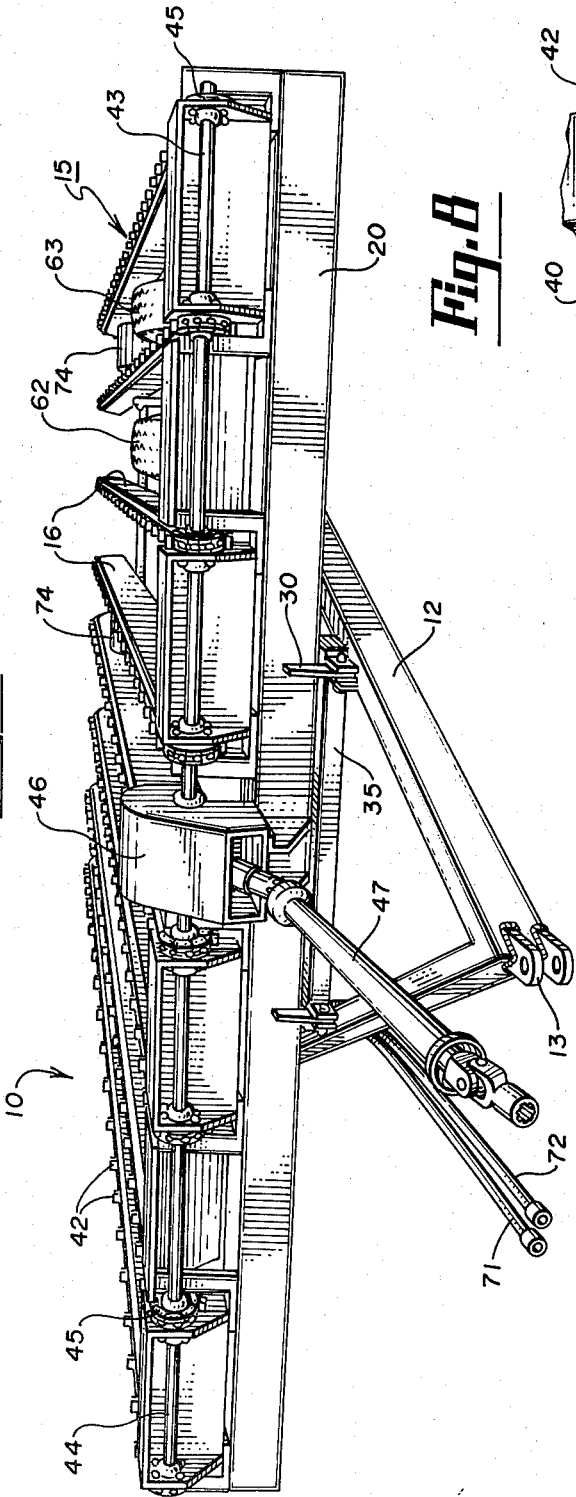

FORAGE STACK MOVER

This invention relates to the field of agricultural material and more particularly to the field of forage stack moving equipment.

Various forms of hay or straw stack movers have been in existence for some time such as the cable mover as disclosed in the Fritz Lahman U.S. Pat. No. 2,761,577, the baled hay loading and unloading device of Lisota, U.S. Pat. No. 2,408,862, and the hay stack transporting device of Boyd Schiltz, U.S. Pat. No. 3,298,550.

One of the more important aspects of loading and unloading forage materials such as hay, straw, cotton, and other fibrous materials is to keep the stack in tact while moving it onto and off of the bed assembly of the vehicle. Most of the prior art accomplishes the tilting action of the bed mechanism with respect to a frame member by pivoting the bed member about a transverse horizontal axis located on the rear portion of the frame of the vehicle. That is, by pivoting the bed about an axis on the frame, the front portion of the bed is elevated through the use of some form of extensible member such as a hydraulic cylinder and piston, thus causing the rear portion of the bed to come in proximity to the ground which is supporting the stack to be loaded and transported. In accomplishing this form of tilting action, the bed assembly generally makes an angle of ten degrees or more with the ground or horizontal and thus the stack must be rotated through an angle of ten degrees upon moving from the generally horizontal condition on the ground to the bed of the stack mover. In some instances, the frame may be articulated but the tilting action is still maintained by pivoting the bed mechanism with respect to the frame.

Another form of prior art is disclosed in U.S. Pat. No. 1,628,871, issued to Bruce for a fertilizer or straw spreader, and another form of stack mover is disclosed in U.S. Pat. No. 3,012,682 issued to Williamson. In each of those structures, the bed and tongue are secured against pivotal movement and thus the front end of the bed does not rise above the position generally taken during the transport mode of operation. However, those two mechanisms have certain deficiencies that are overcome by my invention. For instance, the Bruce disclosure requires that the wheels be supported on a common axle and move longitudinally through slots from one end of the platform to the other wherein the open condition of the slots make them susceptible to receiving the material being transported which may produce a binding condition for movement of the axle.

The mechanism of the Williamson hay stack hauling, loading and unloading machine would not function properly for attempting to move hay stacks over the area of the wheels but does show a mechanism having the tongue and bed assembly secured to each other in which a pair of tandem wheels are used and move in a general forward motion to lower the rear portion of the bed.

The present invention makes use of a fourbar linkage for supporting the bed assembly. The carriage wheels are secured to the longitudinal carriage member and upon being drawn forward, the linkage permits the bed to be tilted downwardly while not interfering with the loading of the bed. Forward movement of the wheels through the use of the fourbar linkage produces a mechanism that permits loading of a forage stack at a very low angle and thus helps alleviate the problem of breaking the stack due to movement through a sharper angle, as found in the prior art.

It is therefore a general object of this invention to provide a forage stack mover in which the stack mover bed angle is changed through the longitudinal movement of a four-bar linkage.

It is still another object of this invention to provide a forage stack mover using a fourbar linkage in which the front of the stack mover remains at substantially the same vertical level at all times.

It is still another object of this invention to provide a forage stack mover in which the stack mover maintains a shallow bed angle while loading and unloading a forage stack.

It is a further object of this invention to provide a stabilizing mechanism to aid the under carriage during its various modes of operation.

These and other objects and advantages of the invention will more fully appear from the following description, made in connection with the accompanying drawings, wherein like reference characters refer to the same or similar parts throughout the several views, and in which:

FIGS. 1a and 1b combined are a top plan view of the forage stack mover embodiment of the invention;

FIGS. 2a and 2b combined are a side elevation view of the forage stack mover tilted for loading and unloading of a forage stack;

FIGS. 3a and 3b combined are a side elevation view of the forage stack mover elevated to the position for transportation of a forage stack;

FIG. 4 is an enlarged sectional view of the fourbar linkage and wheel mechanism in the loading and unloading position taken along lines 4—4 of FIGS. 1a and 1b;

FIG. 5 is an enlarged sectional view of the fourbar linkage and wheel mechanism as shown in FIG. 4 but in the transport position;

FIG. 6 is a detailed view of the means for rigidly securing the tongue to the bed mechanism;

FIG. 8 is a detailed view of the journal block connected between the lower carriage member and the vertically extending arm of the fourbar linkage; and FIG. 9 is a front perspective view of the forage stack mover.

Figure 7:
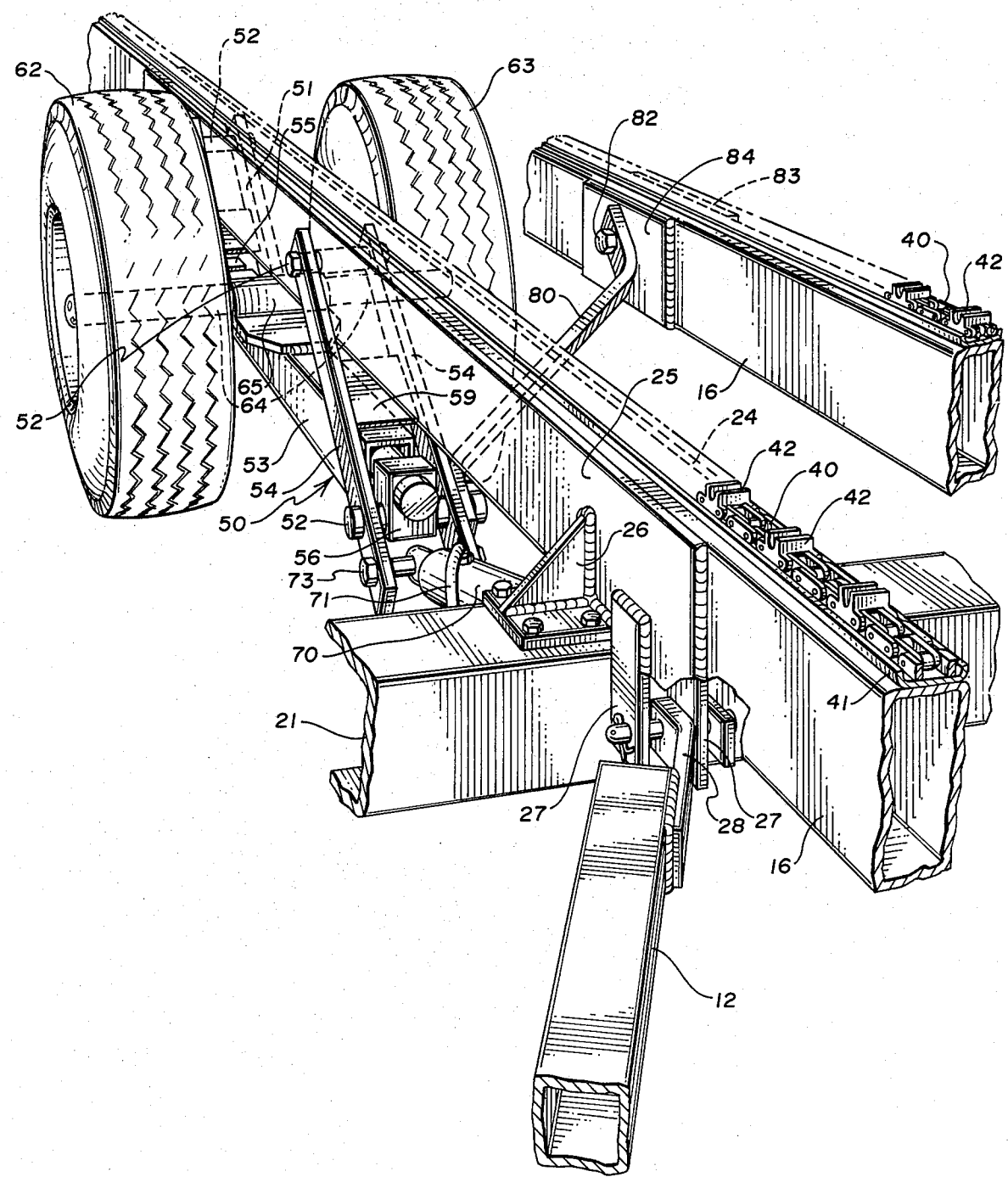
FIG. 7 is a detailed view of the fourbar linkage and radial support arm pivotally connected to the same.

A mobile forage stack mover 10 is disclosed which is in the nature of a trailer-drawn machine that is connected to a tractor 11 to which is connected a tongue 12 or front frame mechanism. The tongue 12 is connected to tractor 11 through a suitable means such as a clevis or hitch 13 that is connected to the tractor drawbar through the use of suitable means such as a hitch pin 14.

A bed mechanism 15 is formed of a plurality of longitudinal beam members 16 that are secured to a plurality of transversely oriented longitudinally spaced cross brace members 20, 21, 22 and 23. A pair of strengthening plates 24 and 25 that extend slightly beyond cross brace members 21 and 22 are welded to the two longitudinal beam members adjacent each of the outside beam members. Each of the longitudinal beam members 16 are secured to cross brace members 20 through 23 by suitable means such as right angle brackets 26 that are welded to beams 16 but are bolted to the cross brace members.

A pair of depending brackets 27 are welded to the reinforcing plates 24 and 25 of each of the two beam members 16 and extend downwardly to engage a pair of end brackets 28 that are pivotally secured to brackets 27 with suitable means such as bolts or pins.

Cross brace member 20 is rigidly secured to tongue 12 through the use of a vertically depending bracket member 30 that is welded to cross brace member 20 and extends downwardly between a pair of upstanding lugs 31 and 32 that are welded to tongue 12. Bores are formed in each of members 30, 31, and 32 and a connecting pin 33 is passed through the bores to rigidly secure the members with respect to each other. A securing pin 34 is passed through a transverse bore in pin 33 to insure that it does not slip from the bores in the three brackets. A channel member 35 is welded at each end to the tongue 12 to elevate the front of bed mechanism 15 to provide the proper angle of tilt, the construction being described in greater detail subsequently.

Each of the longitudinal beam members 16 has an endless chain element 40 that passes over a shallow channel member 41 that is welded to the upper portion of beam 16 which is a hollow channel member. Chain 40 includes a number of U-shaped lugs 42 that are secured to the chain by suitable means such as welding to engage the bottom portion of the forage stack. At the rear of beam 16 is a live roller (not shown) over which the chain passes and is supported at the end of the beam which is tapered. Chain 40 is driven on each of the supporting beams through sprockets and a pair of shafts 43 and 44 that are supported by a plurality of bearings in pillow blocks 45 at the leading end of each of beams 16. The pillow blocks 45 are secured to cross brace member 20 by suitable means such as machine bolts. Each of the shafts is connected to a reversible gear box 46 that is disposed in the center of the transverse expanse of bed 15. Gear box 46 may be of the type manufactured by Lahman Manufacturing Company, Inc., Hecla, S. Dak., in which the gear box is used for a similar type structure. A drive shaft 47 connects the input from reversible gear box 46 to a power takeoff 48 of tractor 11. Shafts 43 and 44 are driven in unison from gear box 46.

A fourbar linkage 50 or parallelogram type mechanism is secured beneath the beams that are reinforced with plates 24 and 25 on each side of the forage stack mover. Each fourbar linkage 50 has a rear vertically extending support arm 51 that is pivotally connected to the beam about a horizontal transverse axis through the use of a machine bolt 52. The lower end of arm 51 is connected to a carriage member 53 that is approximately five feet long on a stack mover having beams that are approximately 28 feet in length. A front vertically extending support arm 54 is pivotally secured to the reinforced beam at its upper end by a suitable means such as a machine bolt 52 that extends about an axis that is generally transverse to the longitudinal direction of beams 16. At the lower end of vertically extending arms 51 and 54 are a pair of journal blocks 55 and 56 respectively. Journal blocks 56 and 55 are shown in greater detail in FIGS. 7 and 8 respectively. Journal block 55 is pivotally connected to the lower ends of arms 51 about a transverse axis by suitable means such as a machine bolt 52. The upper portion of journal block 55 has a bore 57 formed therein at right angles to the axis of machine bolt 52 and has a shaft portion 60 of carriage member 53 extending through the bore and secured in place by a suitable means such as a cap screw 61. Journal block 56 is like that of journal block 55.

It may be advantageous for supporting arm 54 at the front to be slightly longer than arm 51 at the rear of the fourbar linkage 50 to provide an over-center condition during the transport mode of operation. Dual wheels 62 and 63 are connected by a common shaft 64 on both the left and right hand portions of the stack mover where shaft 64 is secured to carriage member 53 by a journal 65, the journal being secured to carriage member 53 by suitable means such as welding or with machine bolts. In other words, dual wheels 62 and 63 straddle lower carriage member 53 on both sides of the stack mover. Journal 65 is disposed rearwardly of the longitudinal center of carriage member 53.

A pair of hydraulic lift cylinders 70 are connected to tractor 11 through a suitable pair of hydraulic lines 71 and 72 to control the action of the piston in the cylinder through a control valve 69. The hydraulic cylinder 70 is pivotally connected to cross member 21 through suitable means such as a carriage bolt 73 and the other end is connected to support arm 54 through a pivotal connection and suitable means such as a machine bolt 73. Cylinders 70 are located beneath the reinforced beam and when extended move the fourbar linkage 50 and the pair of wheels 62 and 63 rearwardly as shown in FIG. 3. In the retracted position, the piston is drawn into cylinder 70 and causes the fourbar linkage and wheels to be drawn forwardly to lower the rear portion of the bed mechanism 15 for a loading and unloading position as shown in FIG. 2. When the rear portion of bed mechanism 15 is lowered, the ends of beams 16 are maintained a few inches above ground through the use of a plurality of tandem rollers 74 and 75 that are pivotally connected to cross brace member 23 by suitable means permitting pivoting about a transverse axis.

To provide additional stability to the fourbar linkage, a plate 58 is welded between support arms 51, thus making the member in the shape of a figure "H". In a similar manner, a plate 59 is secured between support arms 54 to provide additional rigidity to the front support arms. To further aid the fourbar linkage, a pair of guide lugs 76 and 77 are disposed horizontally on the front vertical surface of cross brace member 22 and frictionally engage support arms 51 when they are moved into the transport position such as shown in the phantom lines in FIG. 8. Additionally, a pair of radial arms 80 and 81 are secured to the outer beams 16 through suitable means such as a machine bolt or pin 82. The outer beams have a pair of reinforcing plates 83 and 84 welded about the bores formed in the plates and beams 16 to receive bolts 82. The other end of radial arms 80 and 81 are pivotally secured to the front support arm 54 by machine bolt 52.

In operation, the forage stack mover 10 is connected to tractor 11 and upon reaching a stack to be transported, hydraulic control valve 69 is actuated, causing hydraulic fluid to enter cylinder 70 under pressure and draw the piston into cylinder 70. Fourbar linkage 50 is drawn forwardly and the pivot or support points through the operation of wheels 62 and 63 is thus moved forwardly and upon so doing, the bed mechanism 15 tilts downwardly from a vertical position generally established by clevis 13 and tongue 12 connected to the drawbar of the tractor. That is, wheels 62 and 63 are moved forwardly some 14 to 17 inches permitting the rear portion of that mechanism 15 to be lowered where the ground engaging drums 74 and 75 make contact with the surface of the ground and support the rear portion of beams 16. The power takeoff 48 of tractor 11 is engaged and the reversible gear box 46 turns chains 40 in unison. Once the beams 16 make contact with the forage stack, the tractor is operated in neutral gear, or the clutch is disengaged, thus permitting the stack mover to draw itself under the stack until such time as the friction of the stack is overcome and the stack then moves on to the bed, the bed ceasing its longitudinal motion. That is, U-shaped lugs 42 engage and grip the underneath or bottom portion of the stack producing no relative movement with respect to the chains 40. Upon the beams 16 moving under the stack to the position where the forward force exerted by the chains 40 and lugs 42 against the stack overcomes the friction of the remaining portion of the stack bottom, the beams stop moving rearwardly and the remaining portion of the stack is drawn onto the chains. Once the forage stack is contained upon bed mechanism 15, the power takeoff 48 is disengaged and reversible gear box 46 ceases to drive shafts 43 and 44. Control valve 69 is then actuated to cause hydraulic pressure to enter the other end of hydraulic cylinder 70 which extends the piston, causing the fourbar linkage 50 to move rearwardly and in so doing, wheels 62 and 63 move rearwardly, lifting the rear portion of bed mechanism 15 until it assumes a position like that shown in FIG. 3 for transporting the forage stack to its new location.

Once the forage stack has been transported to its new location and is to be unloaded, the sequence of events just described are repeated with the exception that the reversible gear box is driven in the opposite direction through the tractor power takeoff 48 and the mobile stack mover, with the tractor again in neutral or with the clutch disengaged, will move in a forwardly direction, propelling both the stack mover and tractor until such time as the stack is unloaded or nearly unloaded, at which time the tractor is again driven forwardly to remove the stack mover 10.

With the extremely shallow angle made by bed mechanism 15 with the ground, the bed mechanism acts much like a chissel and is extremely helpful in loading a forage stack which may have been frozen to the ground. In fact, the angle of the bed with respect to the ground is approximately 5 degrees, whereas in the prior art, the angle is at least twice that amount or closer to 13 degrees or more. Should the terrain over which the forage stackmover is being used be uneven or rough, the wheels on each side of the stackmover are free to oscillate about a longitudinal axis through the pivotal connections of the pair of journal blocks 55 and 56 secured between support arms 51 and 54 and the carriage member 53, to which the wheel shaft 64 is secured.

It will, of course, be understood that various changes may be made in the form, details, arrangement and proportions of the parts without departing from the scope of the invention which consists of the matter shown and described herein and set forth in the appended claims.

What is claimed is:

1. A mobile machine adapted to be drawn behind a prime mover for loading, unloading, and transporting a forage stack, comprising:
   a. a frame mechanism having one end thereof constructed and arranged for engagement with the draw bar of the prime mover;
   b. a bed mechanism having a plurality of longitudinal beam members secured to a plurality of transversely oriented longitudinally spaced cross brace members;
   c. means rigidly securing said frame mechanism to the front of said bed mechanism and securing each against movement with respect to the other;
   d. a plurality of endless chain elements having teeth extending normally from said chain for engaging the forage stack, said chain elements disposed on a plurality of said elongated beam members;
   e. a drive mechanism operably connected to said plurality of endless chain elements for driving the same in unison while loading and unloading a forage stack;
   f. a pair of fourbar linkages, each of which has a pair of substantially vertically extending arms spatially disposed longitudinally and pivotally secured at their upper ends to one of said plurality of elongated beam members, the lower ends of said pair of arms being pivotally joined to a longitudinally extending carriage member;
   g. a pair of wheels supported on a transverse axle secured to each of said longitudinally extending carriage members;
   h. a pair of journal blocks pivotally connected to the lower ends of said pair of vertically extending arms about axes transverse to said longitudinal beam members, said journal blocks having a pair of journal boxes with bores at right angles to said axes in said journal blocks, said longitudinally extending carriage members having ends extending through said journal box bores;
   i. and extensible means operably connected between said bed mechanism and said pair of fourbar linkages, said extensible means moving said carriage members vertically away from said bed and frame mechanisms during transporting of the mobile machine and moving said carriage members in vertical proximity to said bed and frame mechanisms during loading and unloading of the mobile machine.

2. A mobile machine adapted to be drawn behind a prime mover for loading, unloading, and transporting a forage stack, comprising:
   a. a frame mechanism having one end thereof constructed and arranged for engagement with the draw bar of the prime mover;
   b. a bed mechanism having a plurality of longitudinal beam members secured to a plurality of transversely oriented longitudinally spaced cross brace members;
   c. means rigidly securing said frame mechanism to the front of said bed mechanism and securing each against movement with respect to the other;
   d. a plurality of endless chain elements having teeth extending normally from said chain for engaging the forage stack, said chain elements disposed on a plurality of said elongated beam members;
   e. a drive mechanism operably connected to said plurality of endless chain elements for driving the same in unison while loading and unloading a forage stack;
   f. a pair of fourbar linkages, each of which has a pair of substantially vertically extending arms spatially disposed longitudinally and pivotally secured at their upper ends to one of said plurality of elongated beam members, the lower ends of said pair of arms being pivotally joined to a longitudinally extending carriage member;
   g. a pair of wheels supported on a transverse axle secured to each of said longitudinally extending carriage members;

h. a plurality of radial arms, each having its lower end pivotally connected to the lower end of one of said vertically extending arms and having its upper end pivotally connected to one of said elongated beam members adjacent said beam members having a fourbar linkage secured thereto;

i. and extensible means operably connected between said bed mechanism and said pair of fourbar linkages, said extensible means moving said carriage members vertically away from said bed and frame mechanisms during transporting of the mobile machine and moving said carriage members in vertical proximity to said bed and frame mechanisms during loading and unloading of the mobile machine.

3. The structure set forth in claims 1 or 2 including:
control means operably connected to said extensible means causing said extensible means to extend and move said carriage members vertically away from said bed mechanism during transporting of the mobile machine, and to contract and move said carriage members in vertical proximity to said bed mechanism during loading and unloading of the mobile machine.

4. The structure set forth in claims 1 or 2 including:
a plurality of guide lugs secured to the cross brace member of said plurality disposed adjacent the most rearwardly disposed vertically extending arms of said four bar linkages, said guide lugs adapted to frictionally engage said most rearwardly disposed vertically extending arms when said carriage members are farthest from said beam members.

5. The structure set forth in claims 1 or 2 including:
a plurality of plates fixedly secured to the sides of said elongated beam members to encompass the pivotal locations of said vertically extending arms and said radial arms.

6. The structure set forth in claims 1 or 2 wherein said extensible means is fluidly controlled and moves said fourbar linkages and said pair of wheels between a forward position for loading and unloading the mobile machine and a rearward position for transporting the mobile machine.

7. The structure set forth in claims 1 or 2 wherein said drive mechanism is constructed and arranged to be operably connected to the prime mover.

8. The structure set forth in claims 1 or 2 wherein said frame mechanism and said bed mechanism are formed integrally so that said frame mechanism is an extension of said bed mechanism.

* * * * *